US012372028B2

(12) United States Patent
Alecu et al.

(10) Patent No.: US 12,372,028 B2
(45) Date of Patent: Jul. 29, 2025

(54) AIRCRAFT ENGINE WITH SQUEEZE FILM DAMPER

(71) Applicant: PRATT & WHITNEY CANADA CORP., Longueuil (CA)

(72) Inventors: Daniel Alecu, Brampton (CA); Laslo Tibor Diosady, Etobicoke (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 171 days.

(21) Appl. No.: 18/329,017

(22) Filed: Jun. 5, 2023

(65) Prior Publication Data
US 2024/0401529 A1 Dec. 5, 2024

(51) Int. Cl.
*F02C 7/06* (2006.01)
*F16C 27/04* (2006.01)
*F16C 33/78* (2006.01)

(52) U.S. Cl.
CPC .............. *F02C 7/06* (2013.01); *F16C 27/045* (2013.01); *F16C 33/782* (2013.01); *F05D 2240/53* (2013.01); *F05D 2240/54* (2013.01); *F05D 2240/55* (2013.01)

(58) Field of Classification Search
CPC .. F16C 27/045; F16C 33/782; F16C 2360/23; F05D 2240/54; F05D 2240/55; F02C 7/06
See application file for complete search history.

(56) References Cited

U.S. PATENT DOCUMENTS

| 5,067,825 | A | * | 11/1991 | Vance | ................ | F16F 15/0237 |
| | | | | | | 384/99 |
| 5,169,240 | A | * | 12/1992 | Bobo | ................ | F16F 15/0237 |
| | | | | | | 29/898.1 |
| 5,188,375 | A | | 2/1993 | Pope et al. | | |
| 5,228,784 | A | | 7/1993 | Bobo | | |
| 8,070,435 | B1 | | 12/2011 | Eng | | |
| 9,915,174 | B1 | | 3/2018 | Morris et al. | | |
| 10,900,379 | B2 | | 1/2021 | Gysling et al. | | |
| 2002/0076124 | A1 | | 6/2002 | Bos et al. | | |

FOREIGN PATENT DOCUMENTS

EP 1170520 1/2002

* cited by examiner

*Primary Examiner* — John Olszewski
*Assistant Examiner* — Aimee Tran Nguyen
(74) *Attorney, Agent, or Firm* — NORTON ROSE FULBRIGHT CANADA LLP

(57) ABSTRACT

An aircraft engine, comprising: a shaft; a bearing housing extending around the shaft and defining a bearing cavity; a bearing in the bearing cavity and rotatably supporting the shaft; a squeeze film damper including: a first seal proximate a first end of the bearing, and a second seal proximate a second end of the bearing; an annulus between the first seal and the second seal, the annulus having a damping fluid in the annulus; and wherein at least the first seal includes a sealing ring received within a groove extending axially from an outer groove wall to an inner groove wall, the inner groove wall located axially between the outer groove wall and the annulus, the sealing ring having an outer ring face facing the outer groove wall and an inner ring face facing the inner groove wall, the inner ring face being movable relative to the outer ring face.

14 Claims, 9 Drawing Sheets

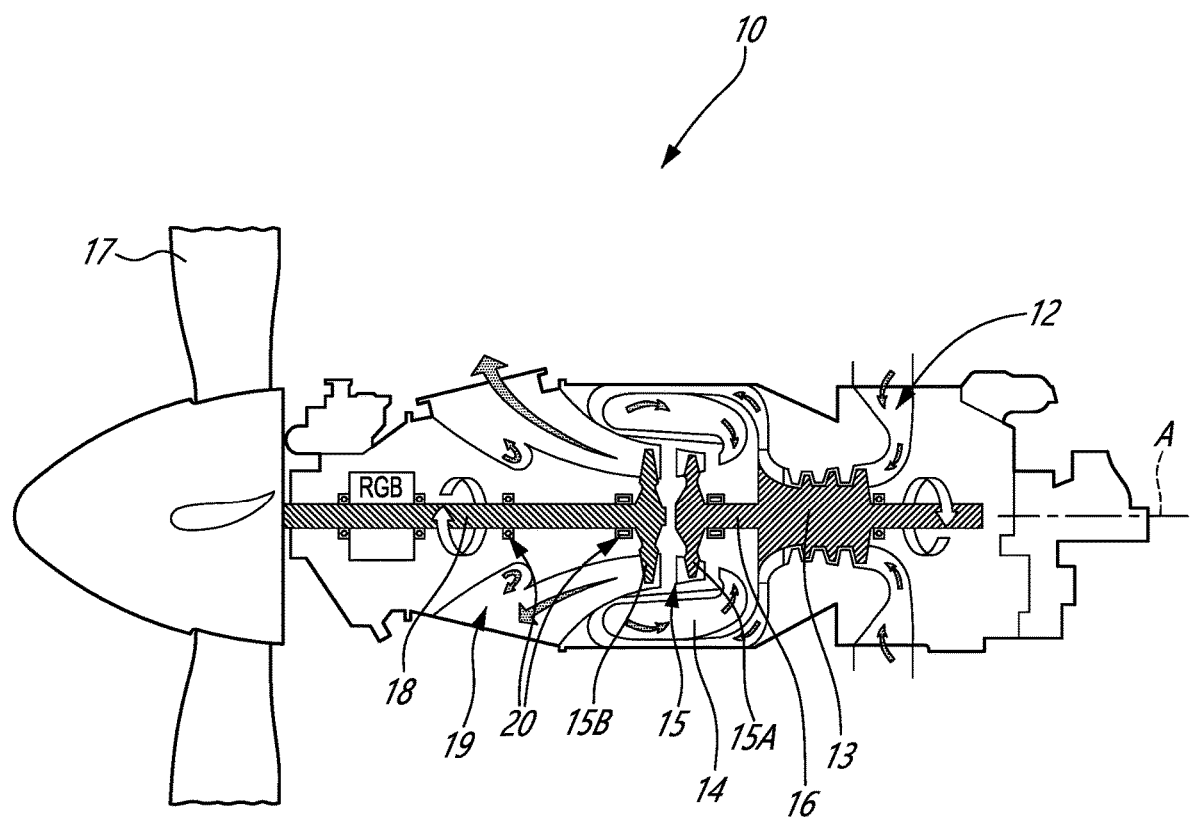

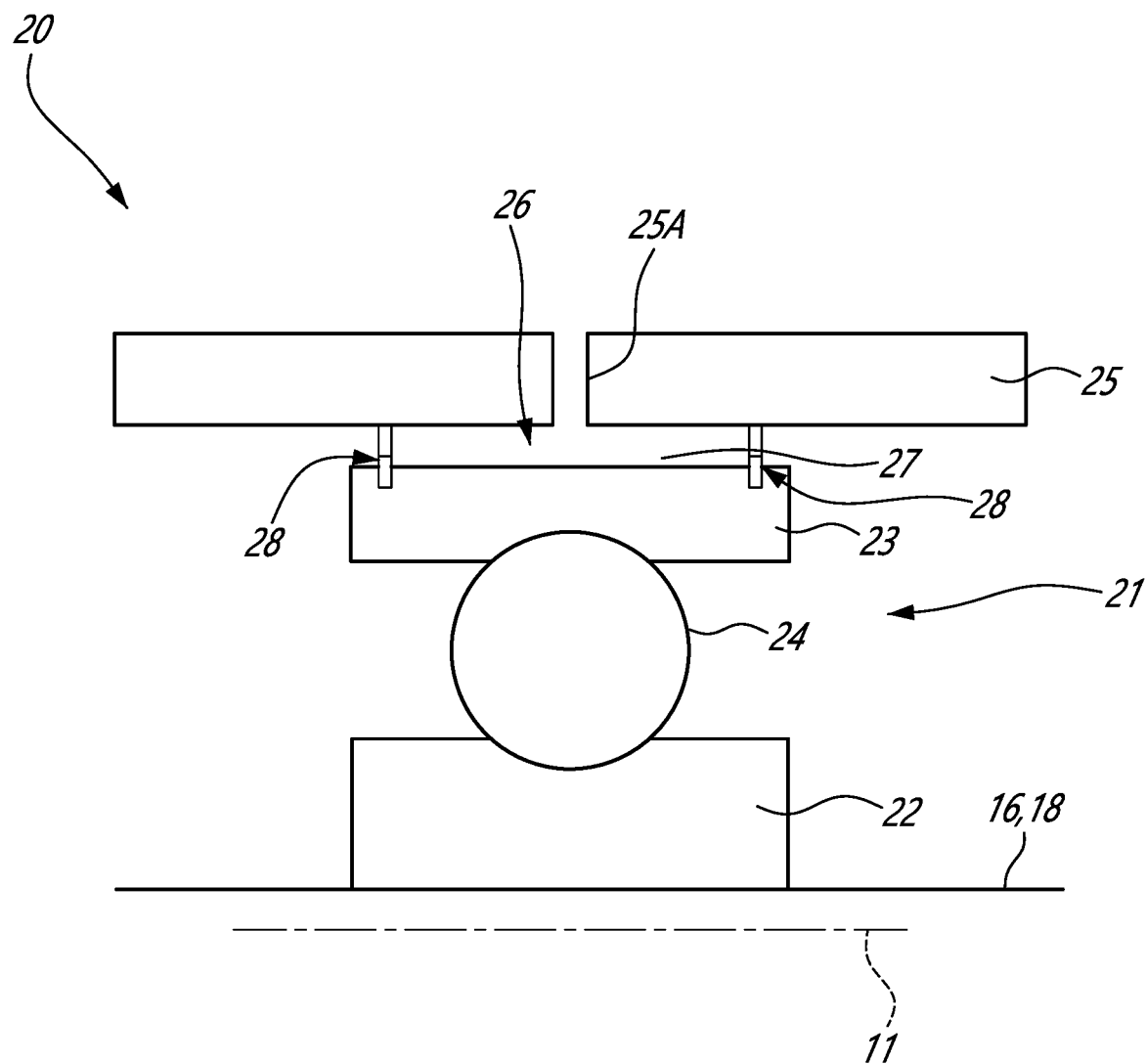

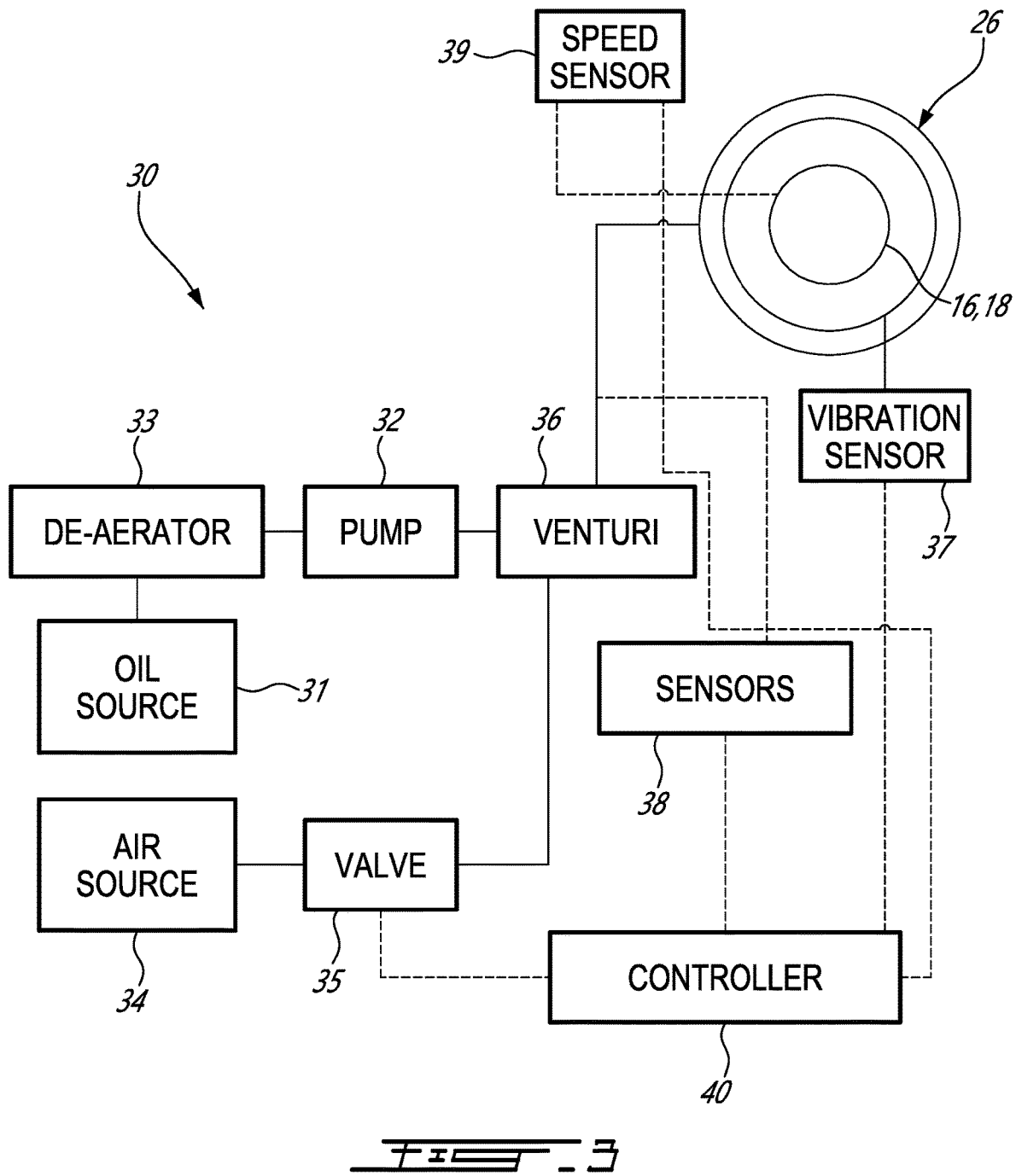

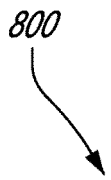

800

| Mitigate leakage of a damping fluid out of the annulus by pushing a sealing ring of one of the seals axially outward, away from the annulus and into abutment with an outer groove wall of a groove receiving the sealing ring, when a pressure of the damping fluid contained in the annulus is greater than an air pressure outside the annulus | 802 |

| Mitigate air ingestion into the annulus by axially displacing opposite ring faces of the sealing ring relative to one another by admitting one or more of air and the damping fluid within an annular space defined by the sealing ring between the opposite ring faces until the sealing ring is in abutment against an inner groove wall of the groove when the pressure of the damping fluid is less than the air pressure outside the annulus | 804 |

FIG. 8

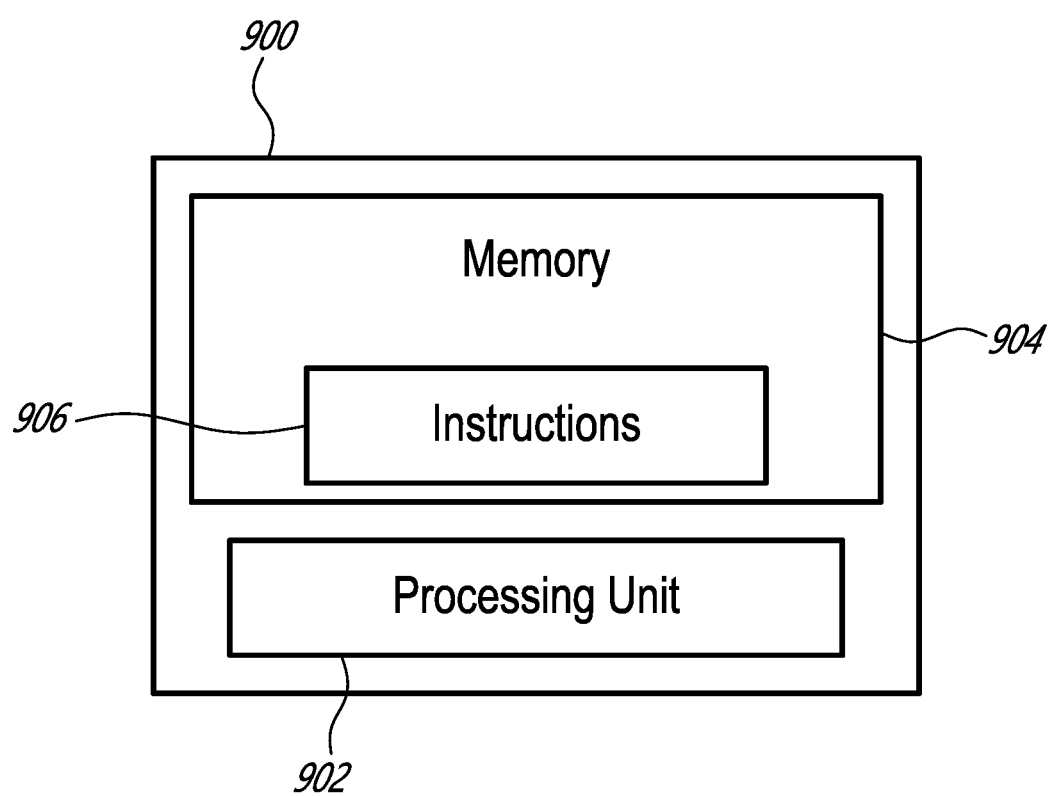

AIRCRAFT ENGINE WITH SQUEEZE FILM DAMPER

TECHNICAL FIELD

The disclosure relates generally to aircraft engines and, more particularly, to bearing assemblies and squeeze film dampers used with bearing assemblies.

BACKGROUND

Aircraft engines, such as gas turbine engines, use bearings for supporting rotating shafts. Bearings are typically contained within bearing cavities defined by bearing housings, within which the bearings are radially supported. In some engines, squeeze film dampers are located radially between outer races of the bearings and the bearing housings. Such squeeze film dampers are fed with oil and at least partially dampen vibrations of the shaft. Squeeze film dampers vary in behavior with varying operating conditions, which may affect how they dampen vibrations. While suitable for the intended purposes, improvements are sought.

SUMMARY

In one aspect, there is provided an aircraft engine, comprising: a shaft rotatable about a central axis; a bearing housing extending around the shaft and defining a bearing cavity; a bearing located within the bearing cavity, the bearing rotatably supporting the shaft; a squeeze film damper including: a first seal located proximate a first end of the bearing, and a second seal axially spaced apart form the first seal and located proximate a second end of the bearing; an annulus defined axially between the first seal and the second seal, the annulus defined radially between the bearing and the bearing housing, the annulus having a damping fluid in the annulus; and wherein at least the first seal includes a sealing ring received within a groove defined in one or more of the bearing housing and the bearing, the groove extending axially from an outer groove wall to an inner groove wall, the inner groove wall located axially between the outer groove wall and the annulus, the sealing ring having an outer ring face axially facing the outer groove wall and an inner ring face axially facing the inner groove wall, the inner ring face being axially movable relative to the outer ring face.

The aircraft engine defined above and described herein may also include one or more of the following features, in whole or in part, and in any combination.

In some embodiments, the outer ring face is defined by an outer ring section and the inner ring face is defined by an inner ring section axially spaced apart from the outer ring section, the outer ring section connected to the inner ring section via a biasing member.

In some embodiments, the inner ring section and the outer ring section are two parts of a monolithic ring body.

In some embodiments, a cross-section of the monolithic ring body taken on a plane containing the central axis has a U-shape.

In some embodiments, the inner ring section is a first leg of the monolithic ring body and the outer ring section is a second leg of the monolithic ring body, the biasing member being a web transversally interconnecting the first leg and the second leg.

In some embodiments, the outer ring section and the inner ring section are two distinct ring bodies.

In some embodiments, the biasing member is a spring located between the two distinct ring bodies.

In some embodiments, the outer ring face is defined by an outer ring section and the inner ring face is defined by an inner ring section, the outer ring section and the inner ring section being two distinct ring bodies, an annular space extending a full circumference around the central axis and located axially between the two distinct ring bodies.

In some embodiments, the annular space is devoid of a biasing member.

In some embodiments, the annular space extends uninterruptedly from an radially inner face of the sealing ring to a radially outer face of the sealing ring.

In some embodiments, the annular space is slanted and extends towards the annulus from the radially inner face to the radially outer face.

In yet another aspect, there is provided a method of sealing a squeeze film damper, comprising: mitigating leakage of a damping fluid out of an annulus defined radially between a bearing and a bearing housing by pushing a sealing ring of one of seals disposed at axial ends of the annulus axially outward, away from the annulus and into abutment with an outer groove wall of a groove receiving the sealing ring, when a pressure of the damping fluid contained in the annulus is greater than an air pressure outside the annulus; and mitigating air ingestion into the annulus by axially displacing opposite ring faces of the sealing ring relative to one another by admitting one or more of air and the damping fluid within an annular space defined by the sealing ring between the opposite ring faces until the sealing ring is in abutment against an inner groove wall of the groove when the pressure of the damping fluid is less than the air pressure outside the annulus.

The method defined above and described herein may also include one or more of the following features, in whole or in part, and in any combination.

In some embodiments, the axially displacing of the opposite ring faces of the sealing ring includes moving an inner ring section of the sealing ring away from an outer ring section of the sealing ring with a biasing member.

In some embodiments, the inner ring section and the outer ring section are two parts of a monolithic ring body, the moving of the inner ring section away from the outer ring section includes changing a shape of a web interconnecting the inner ring section to the outer ring section.

In some embodiments, the inner ring section and the outer ring section are two distinct bodies, the moving of the inner ring section away from the outer ring section includes changing a length of a spring located between the inner ring section and the outer ring section.

In some embodiments, the axially displacing of the opposite ring faces of the sealing ring includes moving an inner ring section of the sealing ring away from an outer ring section of the sealing ring with the one or more of the air and the damping fluid received within the annular space.

In some embodiments, the annular space is devoid of a biasing member, the moving of the inner ring section away from the outer ring section includes moving the inner ring section away from the outer ring section solely with a pressure of the one or more of the air and the damping fluid being greater in the annular space than in the annulus.

In some embodiments, the method includes receiving the one or more of the air and the damping fluid into the annular space extending uninterruptedly from an radially inner face of the sealing ring to a radially outer face of the sealing ring.

In yet another aspect, there is provided an aircraft engine, comprising: a shaft rotatable about a central axis; a bearing housing extending around the shaft and defining a bearing cavity; a bearing located within the bearing cavity, the bearing rotatably supporting the shaft; a squeeze film damper having an annulus defined radially between the bearing and the bearing housing, the annulus receiving a damping fluid; and a first seal and a second seal, the annulus defined axially between the first seal and the second seal, the first seal including a sealing ring received within a groove defined by one or more of the bearing housing and the bearing, the groove extending axially relative to the central axis from an outer groove wall to an inner groove wall, the inner groove wall located axially between the outer groove wall and the annulus, the sealing ring having: an outer ring face facing the outer groove wall; an inner ring face facing the inner groove wall and axially spaced apart from the outer ring face; and apertures circumferentially distributed around the central axis and extending in a direction having an axial component relative to the central axis from the outer ring face to the inner ring face.

In some embodiments, the apertures are radially overlapped by the outer groove wall and the inner groove wall.

It should be understood that any or all of the features or embodiments described herein can be used or combined in any combination with each and every other feature or embodiment described herein unless expressly noted otherwise.

BRIEF DESCRIPTION OF THE DRAWINGS

Reference is now made to the accompanying figures in which:

FIG. 1 is a schematic cross-sectional view of an aircraft engine depicted as a gas turbine engine;

FIG. 2 is a cross-sectional view of a bearing assembly of the gas turbine engine of FIG. 1;

FIG. 3 is a schematic view of an oil system for supplying a damping fluid to a squeeze film damper of the bearing assembly of FIG. 2;

FIG. 8 is a flowchart illustrating steps of a method of sealing a squeeze film damper; and FIG. 9 is a schematic representation of a controller in accordance with one embodiment of the present disclosure.

DETAILED DESCRIPTION

Figure 4A:
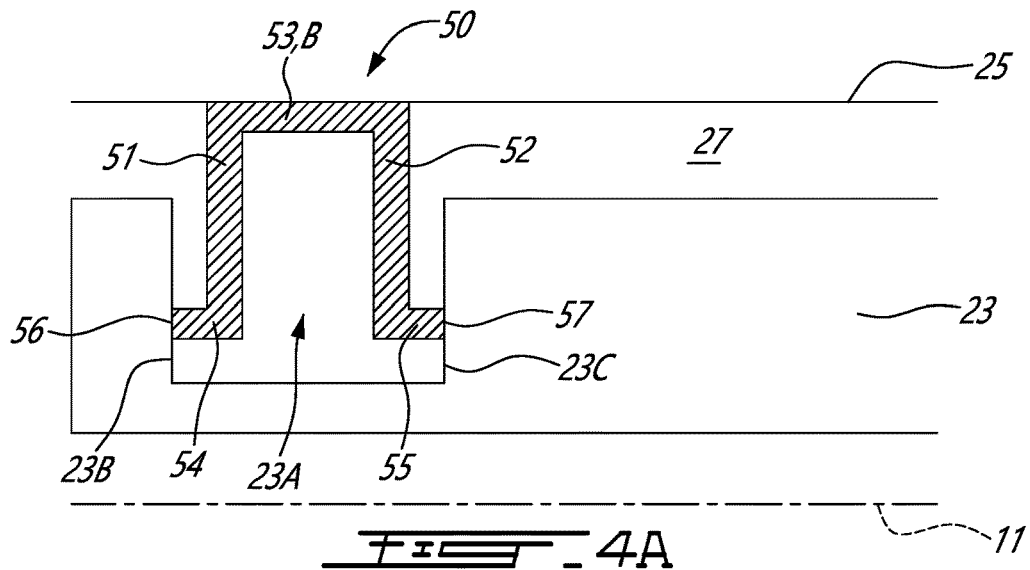
FIG. 4A is a cross-sectional view of a sealing ring in accordance with one embodiment.

FIG. 1 illustrates an aircraft engine depicted as a gas turbine engine 10 of a type preferably provided for use in subsonic flight, generally comprising, in serial flow communication, an inlet 12 for receiving air, a compressor section 13 for compressing the air received via the inlet 12, a combustor 14 for mixing fuel with the compressed air and for generating an annular stream of combustion gases, and a turbine section 15 receiving the combustion gases from the combustor 14. The turbine section 15 has a high-pressure turbine 15A drivingly engaged to the compressor section 13 via a high-pressure shaft 16, which is rotatable about a centerline A of the gas turbine engine 10. The turbine section 15 further has a power or low-pressure turbine 15B downstream of the high-pressure turbine 15A and drivingly engaged to a propeller 17 via a low-pressure shaft 18. The low-pressure shaft 18 may be directly engaged to the propeller 17 or, as shown herein, drivingly engaged to the propeller 17 via a reduction gearbox RGB. The gas turbine engine 10 has an exhaust 19 for expelling the combustion gases. Although the depicted gas turbine engine 10 is a turboprop engine, the present disclosure may apply to other engines, such as turboshaft engines and to auxiliary power units (APU). In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18. The high-pressure shaft 16 and the low-pressure shaft 18 are rollingly supported by bearings. As understood by one skilled in the art, alternate engine types include additional or alternate components. For a non-limiting example, a turbofan engine includes a fan in lieu of the propeller 17.

Referring now to FIG. 2, a bearing assembly is shown at 20. The bearing assembly 20 includes a bearing 21. Although the bearing assembly 20 is depicted as containing only one bearing 21, it may alternatively contain a plurality of bearings 21. The bearing 21 has an inner race 22 secured to a shaft, such as the high-pressure shaft 16 or the low-pressure shaft 18, an outer race 23 surrounding the inner race 22, and rolling elements 24, such as balls or cylindrical rollers, disposed radially between the inner race 22 and the outer race 23. The rolling elements 24 rotate about their respective central axis and about a central axis 11 of the gas turbine engine 10 to permit a rotation of the inner race 22 relative to the outer race 23. The outer race 23 is typically non-rotatable relative to the central axis 11 and is secured to a bearing housing 25. The bearing housing 25 is secured to an outer case of the gas turbine engine 10. Thus, loads may be transmitted along a load path extending radially outwardly from the shaft to the outer casing through the bearing 21 and the bearing housing 25. However, in some situations, the shaft may not be perfectly balanced. This imbalance may create vibrations. To at least partially alleviate these vibrations, a squeeze film damper 26 is disposed radially between the bearing 21 and the bearing housing 25. More particularly, the squeeze film damper 26 is located between the outer race 23 and the bearing housing 25. The squeeze film damper 26 is thus part of the load path that transfers the load from the shaft to the outer casing of the gas turbine engine 10.

The vibrations may be caused by many phenomena. For instance, the shaft may not be perfectly balanced. In some cases, ice may accrue on rotating parts of the compressor section 13 and/or of the turbine section 15. The ice may not accrue in a perfectly axisymmetric manner thus causing an assembly of the compressor section 13, turbine section 15, and shaft 16, 18, commonly referred to as a spool, to become rotationally imbalanced. Vibrations may thus be generated by this imbalance. The squeeze film damper 26 is used to at least partially alleviate these vibrations.

The squeeze film damper 26 includes an annulus 27, which may also be referred to as an annular cavity, that extends circumferentially all around the central axis 11 and that contains a damping fluid, typically a mixture of oil and air. Sealing members 28 are disposed proximate opposed axial ends of the annulus 27 to restrict a flow rate of the damping fluid out of the annulus 27. The annulus 27 is therefore defined axially between first and second seals, and is radially defined radially between a bearing and a bearing housing. These sealing members 28 may be received within grooves defined by one or more of the outer race 23 and the bearing housing 25 and are radially compliant to permit a radial motion of the outer race 23 relative to the bearing housing 25. The sealing members 28 are used to create a flow resistance to the damping fluid leaving the annulus 27 (thereby limiting leakage of the damping fluid axially and/or away from the bearing cavity). The bearing housing 25 defines an inlet 25A for supplying the oil to the squeeze film damper 26. In use, the annulus 27 is continuously fed with the damping fluid that flows out thereof through the sealing members 28 and that is received within the bearing cavity for lubrication of the bearing 21. The damping fluid is then scavenged and flown back to an oil reservoir.

Referring now to FIG. 3, an oil system of the gas turbine engine 10 is shown at 30. The oil system 30 is used to carry many functions such as supplying the bearing cavity defined by the bearing housing 25 with oil for lubricating the bearing 21. The oil system 30 may further power some hydraulic actuators and may be used for cooling some components of the gas turbine engine 10. In this case, the oil system 30 is further used to supply the squeeze film damper 26 with the damping fluid, which corresponds to a mixture of oil and air.

The oil system 30 includes an oil source 31, such as an oil reservoir, fluidly connected to the squeeze film damper 26 via a suitable fluid line. A pump 32 fluidly connects the oil source 31 to the squeeze film damper 26. The pump 32 is used to drive a flow of oil from the oil source 31 to the squeeze film damper 26. The oil may contain a certain amount of air. Put differently, the fluid drawn from the oil source 31 by the pump 32 may be a mixture of oil and air. A de-aerator 33 is in fluid communication with the oil source 31 upstream of the squeeze film damper 26. In the present embodiment, the de-aerator 33 is located upstream of the pump 32, but may alternatively be located downstream of the pump 32. The de-aerator 33 is used to remove at least a portion of the air contained in the oil before feeding the oil to the bearing cavity for lubricating the bearing 21. In this embodiment, a portion of the oil drawn from the oil source 31 is also used to feed the squeeze film damper 26. The de-aerator 33 may be an active de-aerator in which air is separated from the oil via centrifugation. In some embodiments, the de-aerator 33 may be omitted. In such a case, the air may separate from the oil naturally as the oil sits in an oil tank.

Although the bearing housing 25 and the outer race 23 of the bearing 21 are not rotating one relative to the other, they may move relative to one another because of the vibrations imparted by the shaft on the bearing 21. The clearance or gap defined radially between the outer race 23 of the bearing 21 and the bearing housing 25 allows a whirling motion that imparts a wave-like motion of the damping fluid around the central axis 11. This whirling motion results in a pressure distribution that produces a net reaction force that is typically shifted in phase ahead of an eccentricity vector of the shaft. The reaction component along the eccentricity vector opposes the increase in eccentricity. A ratio between the reaction component and the eccentricity is referred to as the stiffness while a reaction component perpendicular to the eccentricity vector opposes an increase in the whirling velocity. A ratio between the perpendicular component and the whirling velocity is referred to as a damping coefficient.

In some cases, vibrations generated by the shaft 16, 18 may have an amplitude greater than an amplitude threshold. This situation may require the squeeze film damper 26 to be more compliant in order to dampen the vibrations. It has been found that a damping characteristic of the squeeze film damper 26 may be varied by varying one or more of a pressure of the damping fluid supplied to the squeeze film damper 26 and an air relative volume of the damping fluid. The air relative volume is defined as a ratio of a volume of air to a volume of oil by units of volume (e.g., cubic inch) of the damping fluid. The stiffness of the squeeze film damper 26 may be decreased by one or more of decreasing the pressure of the damping fluid and increasing the air relative volume. The latter has the effect of increasing a compressibility of the damping fluid. A greater compressibility may increase the ability of the squeeze film damper 26 to absorb or dampen vibrations.

In the embodiment shown, the oil system 30 includes a controller 40 configured to control the squeeze film damper 26 to vary its stiffness as a function of the vibrations that needs dampening. The controller 40 is able to vary parameters of operation of the squeeze film damper 26 to operate the squeeze film damper 26 in either one of two distinct regimes, referred to below as a first regime and a second regime. The first regime is typically used in normal operations when vibrations have an amplitude below a first amplitude threshold whereas the second regime is used when vibrations have amplitude above a second amplitude threshold. The second amplitude threshold is equal to or greater than the first amplitude threshold.

In the first regime, the squeeze film damper 26 may be characterized as stiff. In the first regime, a speed of the damping fluid in the annulus 27 is less than a speed of sound in the damping fluid. The speed of sound in the damping fluid corresponds to a speed at which sound waves travel within the damping fluid. Typically, the speed of sound is greater in liquids than it is in gas. In the second regime, the squeeze film damper 26 may be characterized as compliant. In the second regime, the speed of the damping fluid in the annulus 27 is greater than the speed of sound in the damping fluid.

The oil system 30 is therefore used to control a quantity of air injected in the annulus 27 to vary the speed of sound of the damping fluid. However, care should be taken to avoid air from entering the annulus 27 through the sealing members 28. More specifically, the sealing members 28 may be sealing rings received within grooves defined by one or more of the bearing housing 25 and the outer race 23 of the bearing 21. When the pressure of the damping fluid inside the annulus 27 is greater than the air pressure in the bearing cavity outside the annulus 27, the sealing ring is biased against a wall of the groove thereby preventing air ingestion by allowing some of the damping fluid to flow out of the annulus 27. However, at some circumferential positions around the annulus 27, the local pressure of the damping fluid may become less than the air pressure in the bearing cavity. This may allow the sealing ring to become unseated from the wall of the groove thereby permitting air to penetrate the annulus 27. This is undesirable.

Referring now to FIG. 4A, an embodiment of a sealing ring is shown at 50. The sealing ring 50 may at least partially alleviate the aforementioned drawbacks. The sealing ring 50 may be used as one or more of the sealing member(s) 28 of the bearing assembly of FIG. 2. The sealing ring 50 is received within a groove 23A defined by the outer race 23 of the bearing 21. The groove 23A may alternatively defined by the bearing housing 25 or conjointly by the bearing housing 25 and the outer race 23 of the bearing 21 (e.g., with two grooves at least partially facing one another). The groove 23A is defined axially between an outer groove wall 23B and an inner groove wall 23C. The groove 23A is thus located axially between the outer groove wall 23B and the annulus 27. The expression "inner" implies that the inner groove wall 23C is closer to the annulus 27 than the outer groove wall 23B. The same configuration may be present on the opposite axial side of the annulus 27.

In the embodiment shown, the sealing ring 50 includes a single monolithic body that extends circumferentially all around the central axis 11 of the gas turbine engine 10. The sealing ring 50 includes an outer ring section, referred to as an outer leg 51, an inner ring section, referred to as an inner leg 52, and a web 53 that interconnects the outer leg 51 to the inner leg 52. The sealing ring 50 has a generally U-shape when seen in a cross-section taken on a plane containing the central axis 11. The sealing ring 50 has an outer annular tab 54 that protrudes axially away from the outer leg 51 towards the outer groove wall 23B. The sealing ring 50 has an inner annular tab 55 that protrudes axially away from the inner leg 52 towards the inner groove wall 23C. The outer annular tab 54 defines an outer ring face 56 of the sealing ring 50 while the inner annular tab 55 defines an inner ring face 57 of the sealing ring 50. The outer ring face 56 faces the outer groove wall 23B while the inner ring face 57 faces the inner groove wall 23C. In some embodiments, the inner annular tab 55 and the outer annular tab 54 may be omitted and the outer ring face 56 and the inner ring face 57 may be defined respectively by the outer leg 51 and the inner leg 52. The outer ring face 56 and the inner ring face 57 are full annular face extending fully around the central axis 11.

Figure 4B:
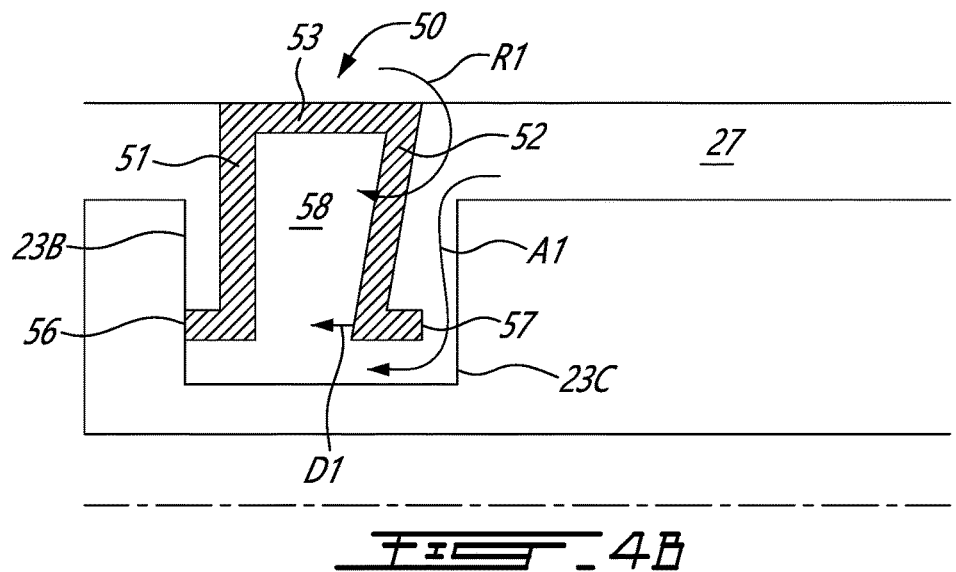
FIG. 4B is a cross-sectional view of the sealing ring of FIG. 4A shown in a first configuration.

Referring now to FIG. 4B, in use, and at some circumferential positions around the annulus 27, the pressure of the damping fluid inside the annulus 27 is greater than the air pressure outside the annulus 27. This pressure differential may exert a force on the sealing ring 50 to cause the inner ring face 57 to axially move relative to the outer ring face 56 along first direction D1 and away from the annulus 27. This may cause the inner ring face 57 to become axially spaced apart from the inner groove wall 23C to create a gap via which the damping fluid may flow out of the annulus 27 along first arrow A1. The damping fluid may thus reach an annular space 58 defined by the sealing ring 50 between the outer leg 51 and the inner leg 52. The pressure exerted by the damping fluid received in the annular space 58 and against the outer leg 51 may cause the outer ring face 56 to become seated against the outer groove wall 23B thereby creating a sealing engagement therebetween that mitigate air ingestion into the annulus 27. Therefore, in this embodiment, the web 53 that transversally interconnects the outer leg 51 and the inner leg 52 acts as a biasing member B that permits an elastic deformation of the sealing ring 50 to axially move the outer ring face 56 relative to the inner ring face 57. Moreover, the pressure exerted by the damping fluid on the inner leg 52 may cause the inner leg 52 to rotate about direction R1 thereby bending the web 53, the inner leg 52, and/or a combination of the two. The web 53 thereby bent may thus transfer a force on the outer leg 51 to further bias the outer ring face 56 against the outer groove wall 23B. This may result in an improved sealing.

Figure 4C:
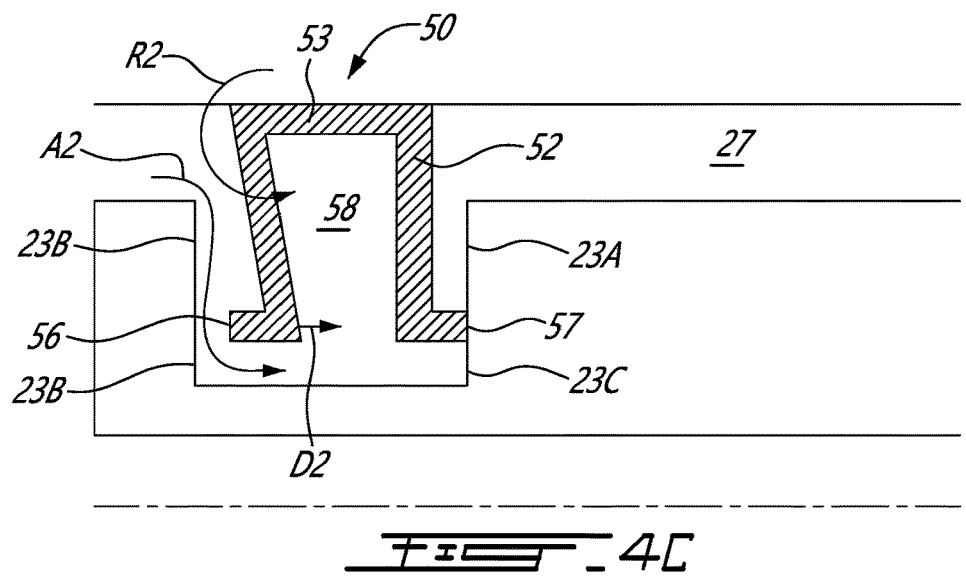
FIG. 4C is a cross-sectional view of the sealing ring of FIG. 4A shown in a second configuration.

Referring now to FIG. 4C, at some other circumferential positions around the annulus 27, the pressure of the damping fluid inside the annulus 27 is less than the air pressure outside the annulus 27. This pressure differential may exert a force on the sealing ring 50 to cause the outer ring face 56 to axially move relative to the inner ring face 57 along second direction D2 and towards the annulus 27. This may cause the outer ring face 56 to become axially spaced apart from the outer groove wall 23B to create a gap via which the air may flow towards the annulus 27 along second arrow A2. The damping fluid may thus reach the annular space 58 and the pressure exerted by one or more of the air and the damping fluid received in the annular space 58 and against the inner leg 52 may cause the inner ring face 57 to become seated against the inner groove wall 23C thereby creating a sealing engagement therebetween that mitigate air ingestion into the annulus 27. The sealing ring 50, and more particularly the inner leg 52 and inner ring face 57, may act as a check valve preventing air ingestion into the annulus 27 if the pressure outside the annulus 27 is greater than the pressure inside the annulus 27. Moreover, the pressure exerted by the air on the outer leg 51 may cause the outer leg 51 to rotate about direction R2 thereby bending the web 53. The web 53 thereby bent may thus transfer a force on the inner leg 52 to further bias the inner ring face 57 against the inner groove wall 23C. This may result in an improved sealing.

It will be appreciated that the sealing ring 50 may become non-axisymmetric during operation. Thus, the sealing ring 50 may simultaneously have the shape depicted in FIG. 4B at some circumferential positions while having the shape depicted in FIG. 4C at some other circumferential positions. The deflections from the at-rest shape of FIG. 4A are exaggerated for illustration purposes.

Figure 5:
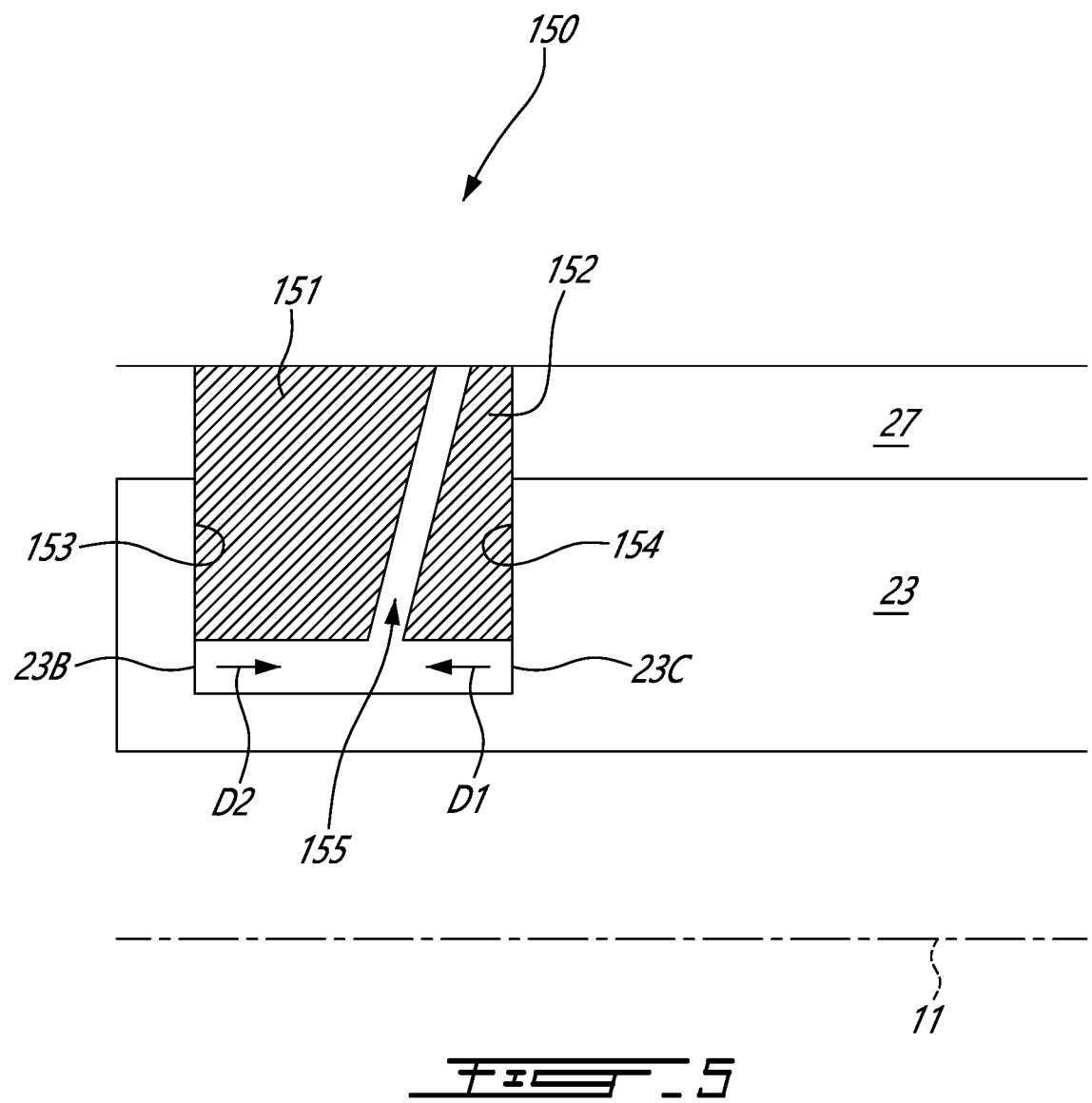
FIG. 5 is a cross-sectional view of a sealing ring in accordance with another embodiment.

Referring now to FIG. 5, a sealing ring in accordance with another embodiment is shown at 150. In this embodiment, the sealing ring 150 includes an outer ring section 151 and an inner ring section 152. The outer ring section 151 and the inner ring section 152 are two distinct ring bodies extending circumferentially around the central axis 11. In the embodiment shown, the outer ring section 151 and the inner ring section 152 extends a full circumference around the central axis 11. The outer ring section 151 defines an outer ring face 153 that faces the outer groove wall 23B while the inner ring section 152 defines an inner ring face 154 that faces the inner groove wall 23C. The inner ring face 154 is axially movable relative to the outer ring face 153. An annular space 155 is defined axially between the outer ring section 151 and the inner ring section 152. The annular space 155 extends radially uninterruptedly from a radially inner face of the sealing ring 150 to a radially outer face of the sealing ring 150. The sealing ring 150 and the annular space 155 of this embodiment are devoid of any biasing member. The outer ring section 151 and the inner ring section 152 may thus move independently one relative to the other. In other words, the outer ring section 151 is free of connection to the inner ring section 152.

When the pressure of the damping fluid inside the annulus 27 is greater than the air pressure outside the annulus 27. This pressure differential may exert a force on the sealing ring 150 to cause the inner ring face 154 to axially move relative to the outer ring face 153 along the first direction D1 and away from the annulus 27. This may cause the inner ring face 154 to become axially spaced apart from the inner groove wall 23C to create a gap via which the damping fluid may flow out of the annulus 27. The damping fluid may thus reach the annular space 155 defined by the sealing ring 150. The pressure exerted by the damping fluid received in the annular space 155 and against the outer ring section 151 may cause the outer ring face 153 to become seated against the outer groove wall 23B thereby creating a sealing engagement therebetween that mitigate air ingestion into the annulus 27.

At some other circumferential positions around the annulus 27, the pressure of the damping fluid inside the annulus 27 is less than the air pressure outside the annulus 27. This pressure differential may exert a force on the sealing ring 150 to cause the outer ring face 153 to axially move relative to the inner ring face 154 along the second direction D2 and towards the annulus 27. This may cause the outer ring face 153 to become axially spaced apart from the outer groove wall 23B to create a gap via which the air may flow towards the annulus 27. The damping fluid may thus reach the annular space 155 and the pressure exerted by one or more of the air and the damping fluid received in the annular space 155 and against the inner ring section 152 may cause the inner ring face 154 to become seated against the inner groove wall 23C thereby creating a sealing engagement therebetween that mitigate air ingestion into the annulus 27. The sealing ring 150, and more particularly the inner ring section 152 and inner ring face 154, may act as a check valve preventing air ingestion into the annulus 27 if the pressure outside the annulus 27 is greater than the pressure inside the annulus 27.

In the embodiment shown, the annular space 155 is slanted and extends towards the annulus 27 from the radially inner face to the radially outer face of the sealing ring 150. This configuration may allow the inner ring section 152 to be resiliently deformed radially inwardly in a situation where the inner ring section 152 is subjected to a pressure above a pressure threshold. This configuration may permit the inner ring section 152 to spring back towards the inner groove wall 23C when the pressure in the annulus 27 becomes less than the air pressure outside the annulus 27.

Figure 6:
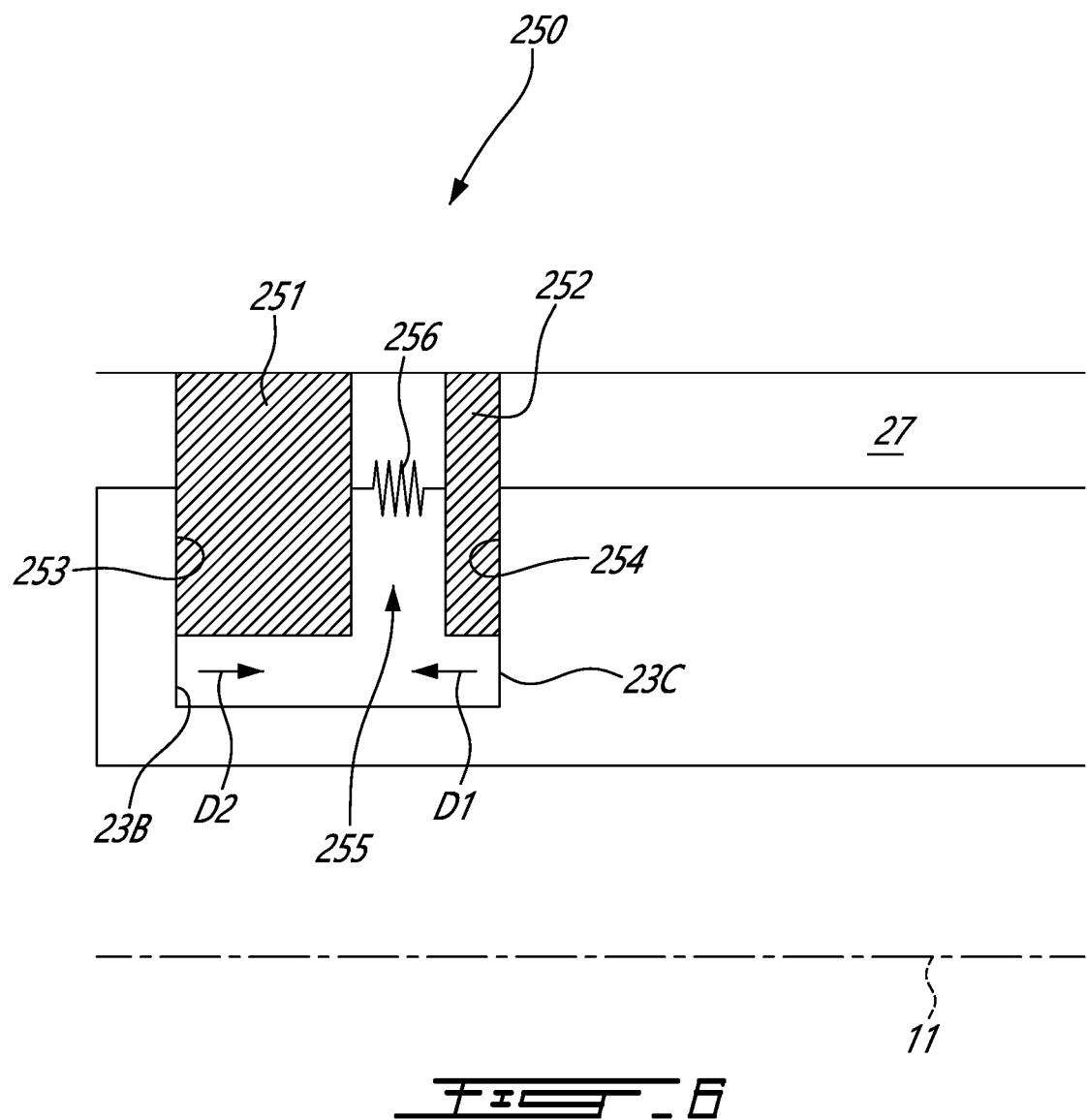
FIG. 6 is a cross-sectional view of a sealing ring in accordance with another embodiment.

Referring now to FIG. 6, another embodiment of a sealing ring is shown at 250. In this embodiment, the sealing ring 250 includes an outer ring section 251 and an inner ring section 252. The outer ring section 251 and the inner ring section 252 are two distinct ring bodies extending circumferentially around the central axis 11. In the embodiment shown, the outer ring section 251 and the inner ring section 252 extend a full circumference around the central axis 11. The outer ring section 251 defines an outer ring face 253 that faces the outer groove wall 23B while the inner ring section 252 defines an inner ring face 254 that faces the inner groove wall 23C. The inner ring face 254 is axially movable relative to the outer ring face 253. An annular space 255 is defined axially between the outer ring section 251 and the inner ring section 252. The annular space 255 extends radially uninterruptedly from a radially inner face of the sealing ring 250 to a radially outer face of the sealing ring 250. A biasing member 256, such as a spring or any other suitable biasing member such as a viscoelastic material, an air piston, and so on, is located within the annular space 255 and is used to push the outer ring section 251 away from the inner ring section 252. The inner ring section 252 is thus secured to the outer ring section 251 via the biasing member 256. The inner ring section 252 may be secured to the outer ring section 251 solely via the biasing member 256.

When the pressure of the damping fluid inside the annulus 27 is greater than the air pressure outside the annulus 27. This pressure differential may exert a force on the sealing ring 250 to cause the inner ring face 254 to axially move relative to the outer ring face 253 along the first direction D1 and away from the annulus 27. This may cause the inner ring face 254 to become axially spaced apart from the inner groove wall 23C to create a gap via which the damping fluid may flow out of the annulus 27. The damping fluid may thus reach the annular space 255 defined by the sealing ring 250. The pressure exerted by the damping fluid received in the annular space 255 and against the outer ring section 251 may cause the outer ring face 253 to become seated against the outer groove wall 23B thereby creating a sealing engagement therebetween that mitigate air ingestion into the annulus 27. Moreover, the pressure exerted by the damping fluid on the inner ring section 252 may compress the biasing member 256. The biasing member 256 may thus transfer a force on the outer ring section 251 to further bias the outer ring section 251 against the outer groove wall 23B. This may result in an improved sealing.

At some other circumferential positions around the annulus 27, the pressure of the damping fluid inside the annulus 27 is less than the air pressure outside the annulus 27. This pressure differential may exert a force on the sealing ring 250 to cause the outer ring face 253 to axially move relative to the inner ring face 254 along the second direction D2 and towards the annulus 27. This may cause the outer ring face 253 to become axially spaced apart from the outer groove wall 23B to create a gap via which the air may flow towards the annulus 27. The damping fluid may thus reach the annular space 255 and the pressure exerted by one or more of the air and the damping fluid received in the annular space 255 and against the inner ring section 252 may cause the inner ring face 254 to become seated against the inner groove wall 23C thereby creating a sealing engagement therebetween that mitigate air ingestion into the annulus 27. The sealing ring 250, and more particularly the inner ring section 252 and inner ring face 254, may act as a check valve preventing air ingestion into the annulus 27 if the pressure outside the annulus 27 is greater than the pressure inside the annulus 27. Moreover, the pressure exerted by the air on the outer ring section 251 may compress the biasing member 256. The biasing member 256 may thus transfer a force on the inner ring section 252 to further bias the inner ring section 252 against the inner groove wall 23C. This may result in an improved sealing.

Figure 7:
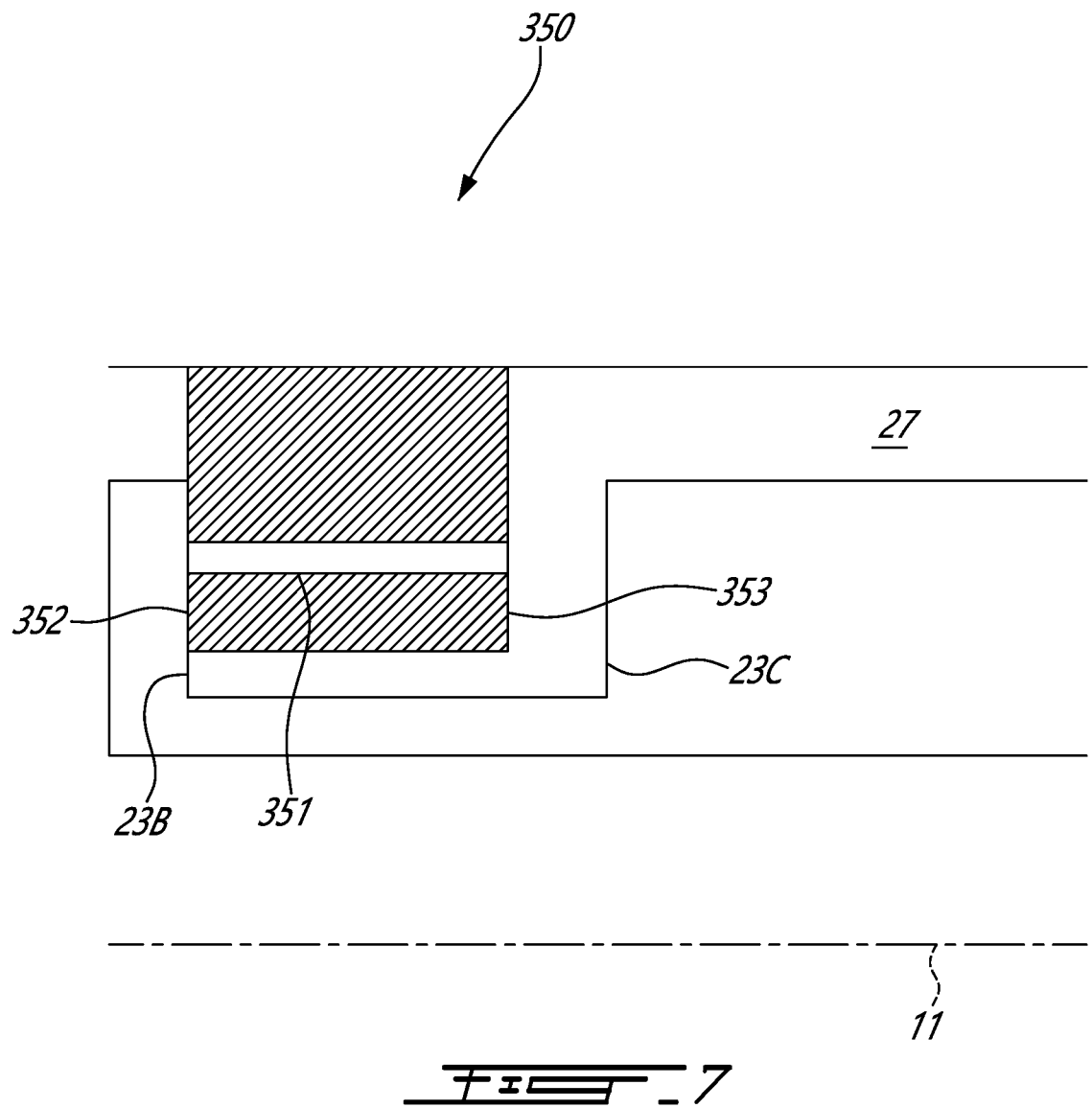
FIG. 7 is a cross-sectional view of a sealing ring in accordance with yet another embodiment.

Referring now to FIG. 7, another embodiment of a sealing ring is shown at 350. In this embodiment, the sealing ring 350 is a single monolithic body defining a plurality of apertures 351 that are circumferentially distributed about the central axis 11. The apertures 351 extend along a direction having an axial component from an outer ring face 352 to an inner ring face 353. Thus, the apertures 351 extends through the sealing ring 350. The apertures 351 are radially overlapped by both of the outer groove wall 23B and the inner groove wall 23C. The apertures 351 may be referred to as calibrated leakage channels since they allow some air to flow through the sealing ring 350 towards the annulus 27.

When the pressure inside the annulus 27 is greater than that outside the annulus 27, the damping fluid pushes the sealing ring 350 such that the outer ring face 352 becomes in abutment against the outer groove wall 23B to create a sealing engagement therebetween. This is possible since a surface area of the inner ring face 353 subjected to the pressure of the damping fluid in the annulus 27 multiplied by the pressure in the annulus 27 is greater than a surface area of the outer ring face 352 multiplied by the pressure outside the annulus 27.

However, when the pressure inside the annulus 27 is less than that outside the annulus 27, the apertures 351 may allow the transmission of the low pressure, in this case the pressure of the damping fluid, to a portion of the outer ring face 352 located radially inwardly of the apertures 351 thus creating a counter-suction effect that opposes the pressure generated by the air outside the annulus 27. Therefore, the portion of the outer ring face 352 contact area between the sealing ring 350 and the outer groove wall 23B is larger than the ring exposed area in the gap.

It will be appreciated that the sealing rings of each of the configurations described above, although they may extend a full circumference, may be non-continuous to allow them to have a radial flexibility. In other words, the ring may extend from a first end to a second end, the first end may be separated (e.g., not connected) to the second end. The sealing ring may thus circumferentially overlap itself along a portion of its circumference. This may allow the ring to deform radially by allowing the first end to move relative to the second end about a circumferential direction. However, in some cases, the sealing rings may be fully continuous around a full circumference.

Referring now to FIG. 8, a method of sealing the annulus 27 is shown at 800. The method 800 includes mitigating leakage of the damping fluid out of the annulus 27 by pushing the sealing ring 50, 150, 250 away from the annulus 27 and in abutment against the outer groove wall 23B of the groove 23A when a pressure of a damping fluid contained in the annulus 27 is greater than an air pressure outside the annulus 27 at 802; and mitigating air ingestion from the bearing cavity into the annulus 27 by receiving one or more of air and the damping fluid within the annular space 58, 155, 255 defined by the sealing ring 50, 150, 250 thereby moving opposite ring faces of the sealing ring 50, 150, 250 away from one another until the sealing ring 50, 150, 250 is in abutment against the inner groove wall 23C of the groove 23A when the pressure of the damping fluid is less than the air pressure outside the annulus 27 at 804.

In the embodiment shown, the moving of the opposite ring faces of the sealing ring 50, 150, 250 away from one another includes moving the inner ring section of the sealing ring away from the outer ring section of the sealing ring with the biasing member B, 256.

As shown in FIG. 4A, the inner ring section and the outer ring section are two parts of a monolithic ring body. The moving of the inner ring section away from the outer ring section includes changing a shape of the web 53 interconnecting the inner ring section to the outer ring section.

As shown in FIG. 6, the inner ring section and the outer ring section are two distinct bodies. The moving of the inner ring section away from the outer ring section includes changing a length of the spring located between the inner ring section and the outer ring section.

As shown in FIG. 5, the moving of the opposite ring faces of the sealing ring 150 away from one another includes moving the inner ring section away from the outer ring section with the one or more of the air and the damping fluid received within the annular space 155. The annular space 155 is devoid of a biasing member. Thus, the moving of the inner ring section away from the outer ring section includes moving the inner ring section away from the outer ring section solely with a pressure of the one or more of the air and the damping fluid being greater in the annular space than in the annulus 27. In this embodiment, the annular space 155 extends uninterruptedly from the radially inner face of the sealing ring 150 to the radially outer face of the sealing ring 150.

All of the above configurations of the sealing ring may keep the ring-seal contact with the outer groove wall 23B and allow air ingestion in a controlled manner, and in some cases blocking any air ingestion. By splitting the ring in two unequal rings, the effect of the low-pressure wave in the annulus 27 is decoupled from the outer ring section. The outer ring section may be heavier in order to be more inert to the effect of the passing low pressure wave.

With reference to FIG. 9, an example of a computing device 900 is illustrated. For simplicity only one computing device 900 is shown but the system may include more computing devices 900 operable to exchange data. The computing devices 900 may be the same or different types of devices. The controller 40 may be implemented with one or more computing devices 900. Note that the controller 40 can be implemented as part of a full-authority digital engine controls (FADEC) or other similar device, including electronic engine control (EEC), engine control unit (ECU), electronic propeller control, propeller control unit, and the like. In some embodiments, the controller 40 is implemented as a Flight Data Acquisition Storage and Transmission system, such as a FAST™ system. The controller 40 may be implemented in part in the FAST™ system and in part in the EEC. Other embodiments may also apply.

The computing device 900 comprises a processing unit 902 and a memory 904 which has stored therein computer-executable instructions 906. The processing unit 902 may comprise any suitable devices configured to implement the method of operating the squeeze film damper such that instructions 906, when executed by the computing device 900 or other programmable apparatus, may cause the functions/acts/steps performed as part of the method of operating the squeeze film damper as described herein to be executed. The processing unit 902 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902.

The methods and systems for operating the squeeze film damper described herein may be implemented in a high level procedural or object oriented programming or scripting language, or a combination thereof, to communicate with or assist in the operation of a computer system, for example the computing device 900. Alternatively, the methods and systems for operating the squeeze film damper may be implemented in assembly or machine language. The language may be a compiled or interpreted language. Program code for implementing the methods and systems for operating the squeeze film damper may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the squeeze film damper may also be considered to be implemented by way of a non-transitory computer-readable storage medium having a computer program stored thereon. The computer program may comprise computer-readable instructions which cause a computer, or more specifically the processing unit 902 of the computing device 900, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element (e.g., "a squeeze film damper") is intended to encompass "one or more" such elements, and similarly the use of the definite article "the" in reference to a particular element is not intended to exclude the possibility that multiple of such elements may be present.

The embodiments described in this document accordingly provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
a shaft rotatable about a central axis;
a bearing housing extending around the shaft and defining a bearing cavity;
a bearing located within the bearing cavity, the bearing rotatably supporting the shaft;
a squeeze film damper including:
a first seal located proximate a first end of the bearing, and a second seal axially spaced apart from the first seal and located proximate a second end of the bearing;
an annulus defined axially between the first seal and the second seal, the annulus defined radially between the bearing and the bearing housing, the annulus having a damping fluid in the annulus; and wherein at least the first seal includes a sealing ring received within a groove defined in one or more of the bearing housing and the bearing, the groove extending axially from an outer groove wall to an inner groove wall, the inner groove wall located axially between the outer groove wall and the annulus, the sealing ring having an outer ring face axially facing the outer groove wall and an inner ring face axially facing the inner groove wall, the inner ring face being axially movable relative to the outer ring face, the outer ring face defined by an outer ring section and the inner ring face is defined by an inner ring section axially spaced apart from the outer ring section, the outer ring section and the inner ring section being two distinct ring bodies.

2. The aircraft engine of claim 1, the outer ring section is connected to the inner ring section via a biasing member.

3. The aircraft engine of claim 2, wherein the biasing member is a spring located between the two distinct ring bodies.

4. The aircraft engine of claim 1, wherein an annular space extends a full circumference around the central axis and located axially between the two distinct ring bodies.

5. The aircraft engine of claim 4, wherein the annular space is devoid of a biasing member.

6. The aircraft engine of claim 5, wherein the annular space extends uninterruptedly from a radially inner face of the sealing ring to a radially outer face of the sealing ring.

7. The aircraft engine of claim 6, wherein the annular space is slanted and extends towards the annulus from the radially inner face to the radially outer face.

8. A method of sealing a squeeze film damper, comprising:

mitigating leakage of a damping fluid out of an annulus defined radially between a bearing and a bearing housing by pushing a sealing ring of one of seals disposed at axial ends of the annulus axially outward, away from the annulus and into abutment with an outer groove wall of a groove receiving the sealing ring, when a pressure of the damping fluid contained in the annulus is greater than an air pressure outside the annulus; and mitigating air ingestion into the annulus by axially displacing opposite ring faces of the sealing ring relative to one another by admitting one or more of air and the damping fluid within an annular space defined by the sealing ring between the opposite ring faces until the sealing ring is in abutment against an inner groove wall of the groove when the pressure of the damping fluid is less than the air pressure outside the annulus, the axially displacing of the opposite ring faces of the sealing ring includes moving an inner ring section of the sealing ring away from an outer ring section of the sealing ring, the inner ring section and the outer ring section being two distinct bodies.

9. The method of claim 8, wherein the moving of the inner ring section of the sealing ring away from the outer ring section of the sealing ring includes moving the inner ring section away from the outer ring section with a biasing member.

10. The method of claim 9, wherein the moving of the inner ring section away from the outer ring section includes changing a length of a spring located between the inner ring section and the outer ring section.

11. The method of claim 8, wherein the axially displacing of the opposite ring faces of the sealing ring includes moving the inner ring section of the sealing ring away from the outer ring section of the sealing ring with the one or more of the air and the damping fluid received within the annular space.

12. The method of claim 11, wherein the annular space is devoid of a biasing member, the moving of the inner ring section away from the outer ring section includes moving the inner ring section away from the outer ring section solely with a pressure of the one or more of the air and the damping fluid being greater in the annular space than in the annulus.

13. The method of claim 12, comprising receiving the one or more of the air and the damping fluid into the annular space extending uninterruptedly from an radially inner face of the sealing ring to a radially outer face of the sealing ring.

14. An aircraft engine, comprising:

a shaft rotatable about a central axis;

a bearing housing extending around the shaft and defining a bearing cavity;

a bearing located within the bearing cavity, the bearing rotatably supporting the shaft;

a squeeze film damper having an annulus defined radially between the bearing and the bearing housing, the annulus receiving a damping fluid; and a first seal and a second seal, the annulus defined axially between the first seal and the second seal, the first seal including a sealing ring received within a groove defined by one or more of the bearing housing and the bearing, the groove extending axially relative to the central axis from an outer groove wall to an inner groove wall, the inner groove wall located axially between the outer groove wall and the annulus, the sealing ring having:

an outer ring face facing the outer groove wall;

an inner ring face facing the inner groove wall and axially spaced apart from the outer ring face; and apertures circumferentially distributed around the central axis and extending in a direction having an axial component relative to the central axis from the outer ring face to the inner ring face, the apertures being radially overlapped by the outer groove wall and the inner groove wall.

* * * * *